(12) United States Patent
Matsubara (10) Patent No.: US 7,390,029 B2
(45) Date of Patent: Jun. 24, 2008

(54) QUICK CONNECTOR

(75) Inventor: Satoshi Matsubara, Koga (JP)

(73) Assignee: Sanoh Kogyo Kabushiki Kaisha, Ibaraki-Ken (JP)

(*) Notice: Subject to any disclaimer, the term of this patent is extended or adjusted under 35 U.S.C. 154(b) by 146 days.

(21) Appl. No.: 10/544,941

(22) PCT Filed: Jul. 6, 2004

(86) PCT No.: PCT/JP2004/009558

§ 371 (c)(1),
(2), (4) Date: Aug. 8, 2005

(87) PCT Pub. No.: WO2005/005875

PCT Pub. Date: Jan. 20, 2005

(65) Prior Publication Data

US 2006/0170211 A1   Aug. 3, 2006

(30) Foreign Application Priority Data

Jul. 10, 2003 (JP) .............................. 2003-194876

(51) Int. Cl.
*F16L 39/00* (2006.01)
(52) U.S. Cl. .............................. 285/321; 285/3; 285/23; 285/921
(58) Field of Classification Search .................. 285/23, 285/319, 321, 921, 3
See application file for complete search history.

(56) References Cited

U.S. PATENT DOCUMENTS

| | | | | | |
|---|---|---|---|---|---|
| 4,946,205 | A | * | 8/1990 | Washizu | 285/319 |
| 5,542,716 | A | * | 8/1996 | Szabo et al. | 285/305 |
| 5,586,792 | A | * | 12/1996 | Kalahasthy et al. | 285/319 |
| 5,855,398 | A | * | 1/1999 | Reinholz | 285/93 |
| 5,863,077 | A | | 1/1999 | Szabo et al. | |
| 5,951,063 | A | * | 9/1999 | Szabo | 285/303 |
| 2002/0079696 | A1 | * | 6/2002 | Szabo | 285/39 |
| 2002/0158465 | A1 | * | 10/2002 | Tsurumi | 285/93 |

FOREIGN PATENT DOCUMENTS

| | | |
|---|---|---|
| EP | 1351007 | 7/2002 |
| JP | 2001-507109 | 5/2001 |
| JP | 2002-206683 | 7/2002 |

* cited by examiner

*Primary Examiner*—Aaron Dunwoody
*Assistant Examiner*—Fannie C. Kee
(74) *Attorney, Agent, or Firm*—Ladas & Parry LLP (57) ABSTRACT

A quick connector has a housing, a retainer for locking a tube at a correct position for complete connection in the housing and a restraining ring for restraining the retainer from being pressed into the housing to its locking position unless the tube is inserted in the housing and placed at the correct position for complete connection to avoid connecting the tube to the quick connector in a falsely locked state. The restraining ring is provided with locking bars that engage with the legs of the retainer to restrain the retainer from being pressed into the housing. The locking bars permit releasing the restraining ring to its releasing position to enable the retainer to be pressed into the housing to the locking position.

8 Claims, 6 Drawing Sheets

PRIOR ART

FIG. 8

PRIOR ART

FIG. 9

QUICK CONNECTOR

TECHNICAL FIELD

The present invention relates to a quick connector for connecting tubes of an automotive fuel supply system or the like.

BACKGROUND ART

Quick connectors are prevalently used, for example, as connectors for connecting fuel tubes of automotive fuel supply systems. A quick connector of this kind including a housing and a retainer is capable of connecting two tubes by simple operations without using any fastening means, such as bolts. The two tubes are connected simply by attaching the housing to one of the tubes, inserting an end part of the other tube in the housing and pressing the retainer into the housing. Representative prior art quick connectors are mentioned in Patent documents 1 and 2.

Figure 8:
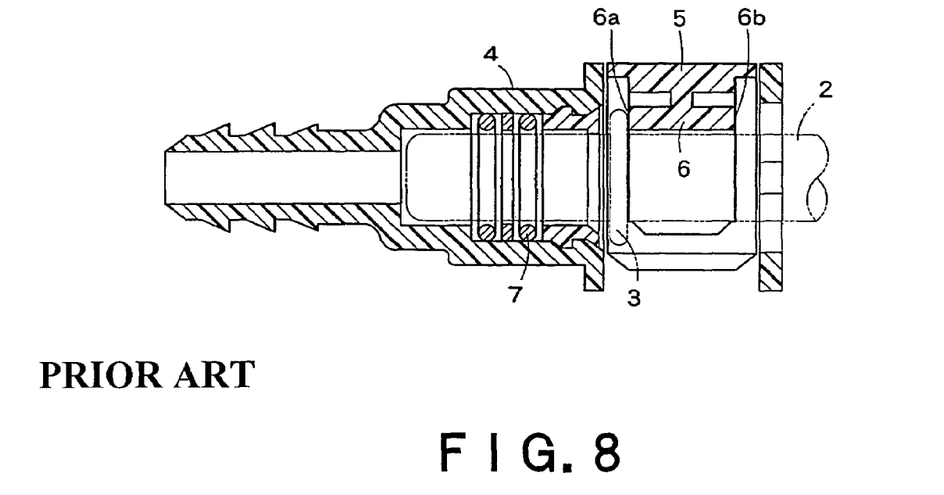
FIG. 8 is a longitudinal sectional view of a conventional quick connector.

Referring to FIG. 8, an annular ridge 3 is formed in the outer circumference of an end part of a tube 2 fitted in a housing 4. A slide retainer 5 is pressed radially in a window formed in the housing 4. An end edge 6a of a rib 6 formed in the retainer 5 engages with the annular ridge 3 to retain the end part of the tube 2 in the housing 4.

A compact quick connector disclosed in Patent document 3 has a slide retainer of a thickness far less than that of the retainer 5 shown in FIG. 8, and a housing shorter than the housing 4 shown in FIG. 8.

Patent document 1: U.S. Pat. No. 5,542,716
Patent document 2: JP 2002-206683 A
Patent document 3: U.S. Pat. No. 5,863,077

DISCLOSURE OF THE INVENTION

It is a problem in the quick connector that the end part of the tube looks as if it is completely connected to the quick connector when the retainer is pressed in the housing to its fastening position and a sealing member placed in the quick connector becomes effective when no pressure is applied thereto notwithstanding the end part of the tube is actually incompletely connected to the quick connector.

Figure 9:
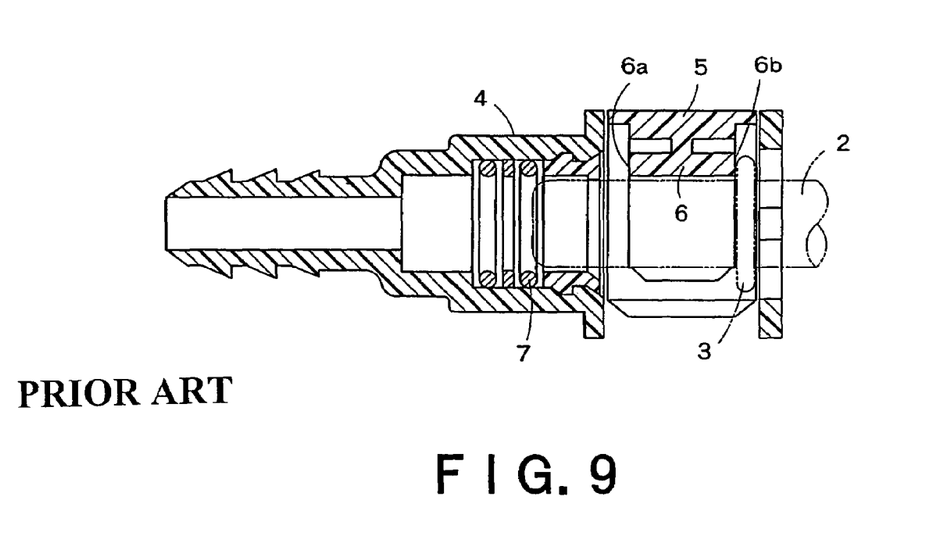
FIG. 9 is a longitudinal sectional view of the conventional quick connector to which a tube is incompletely connected.

According to a correct connecting method as shown in FIGS. 8-9, the retainer 5 must be pressed in the housing 4 after inserting the tube 2 in the housing 4. However, if the retainer 5 is pressed in the housing 4 and then the tube 2 is inserted in the housing 4, the annular ridge 3 is stopped by the other end edge 6b of the rib 6 of the retainer 5 as shown in FIG. 9. Consequently, the tube 2 cannot be fully inserted in the housing 4 and is incompletely connected to the quick connector. However, an end part, extending beyond the annular ridge 3, of the tube 2 is long, the end part engages with an O ring 7 and the sealing effect of the O ring 7 becomes effective. Consequently, the assembly of the quick connector and the tube 2 incompletely connected to the quick connector stands a leakage test and the incomplete connection of the tube 2 to the quick connector is overlooked. A method proposed to avoid overlooking such incomplete connection increases the length of the retainer 5 to shift the end edge 6b outward. When the end edge 6b is shifted outward, the tube 2 is connected to the quick connector in either a complete state or an incomplete state where the joint of the tube 2 and the quick connector is not sealed to avoid false locking. However, the length of the housing of the quick connector increases inevitably.

The quick connector disclosed in Patent document 3 avoids false locking effectively without using a long housing. A retainer included in the quick connector disclosed in Patent document 3 is provided with a restraining ring which is torn off the retainer when a tube is inserted in a housing. Then, the retainer can be pressed in the housing.

However, this quick connector has problems. Practically, the length of an end part of the tube inserted in the housing varies according to force exerted on the tube to insert the tube in the housing so that the restraining ring may be torn off, the restraining ring cannot be easily torn off and hence the action of the quick connector is unstable.

Accordingly, it is an object of the present invention to solve those problems in the prior art and to provide a quick connector having a housing and a retainer that cannot be pressed in the housing to its locking position unless a tube is inserted in the housing and placed at a correct position for complete connection to avoid connecting the tube to the quick connector in a falsely locked state.

Another object of the present invention is to provide a quick connector capable of stably operating to prevent the connection of a tube to the quick connector in a falsely locked state with reliability and having compact construction.

A quick connector according to the present invention having a housing in which an end part, provided with an annular ridge, of a tube is inserted, and a U-shaped retainer capable of being pressed into the housing in a direction perpendicular to the axis of the housing through an opening formed in the housing and of engaging with the annular ridge to connect the tube to the housing includes a restraining ring having an inside diameter not greater than the outside diameter of the annular ridge and greater than the outside diameter of the tube, capable of axially moving in the housing between a restraining position for restraining the retainer from movement and a releasing position for releasing the retainer, provided with locking parts, capable of engaging with legs of the retainer extending along the opposite sides of the retainer, to restrain the retainer from movement; wherein the restraining ring is moved to the releasing position to release the retainer so that the retainer can be moved when the end part of the tube is inserted in the housing and is placed correctly at a predetermined connecting position.

The quick connector according to the present invention is characterized in that holding grooves are formed in the inner surfaces of end parts of the legs, respectively, axial relief grooves are formed in the inner circumference of the housing respectively in alignment with the holding grooves when the retainer is temporarily combined with the housing, the locking parts are disengaged from the holding grooves and are engaged in the relief grooves, respectively, when the restraining ring is moved from the restraining position to the releasing position.

The quick connector according to the present invention is characterized in that the restraining ring is formed integrally with the retainer by connecting parts, corresponding to the holding groves, of the restraining ring and the retainer by shear parts that shear off when the restraining ring is pressed deep into the housing by the annular ridge of the tube.

The quick connector according to the present invention is characterized in that the restraining ring is provided with elastic parts that push the restraining ring toward the restraining position.

BEST MODE FOR CARRYING OUT THE INVENTION

Preferred embodiments of the present invention will be described with reference to the accompanying drawings.

First Embodiment

Figure 1:
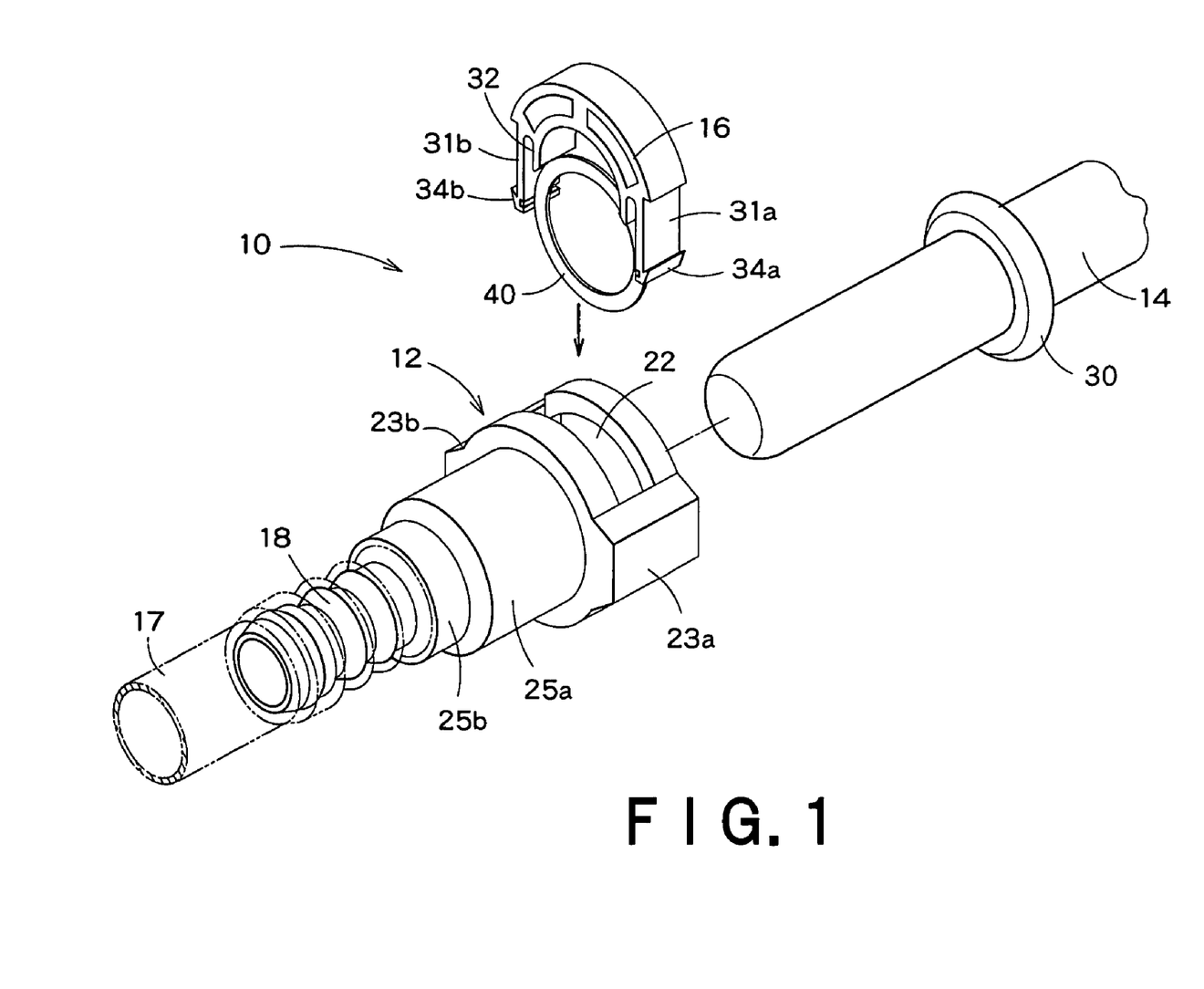
FIG. 1 is an exploded perspective view of a quick connector in a first embodiment according to the present invention.
Figure 2:
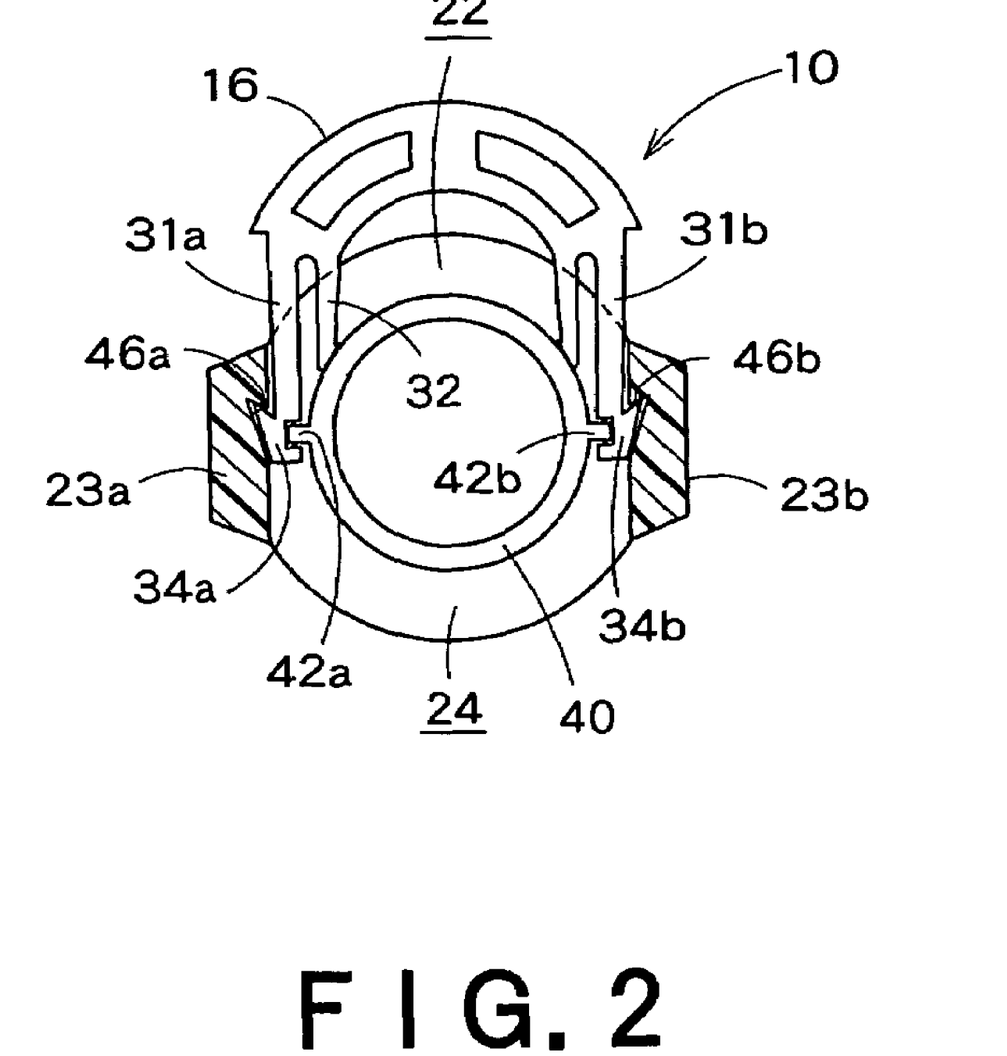
FIG. 2 is a cross-sectional view of the quick connector shown in FIG. 1 in a state where a retainer is at a temporary position.
Figure 3A:
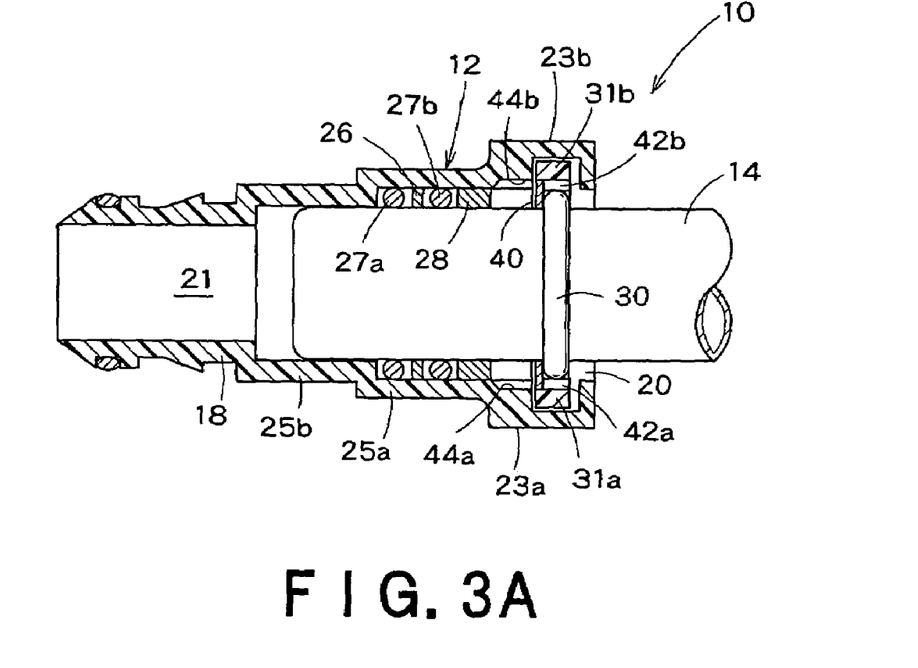
FIG. 3A is a longitudinal sectional view of the quick connector shown in FIG. 1 in a state where a restraining ring is at a restraining position.
Figure 3B:
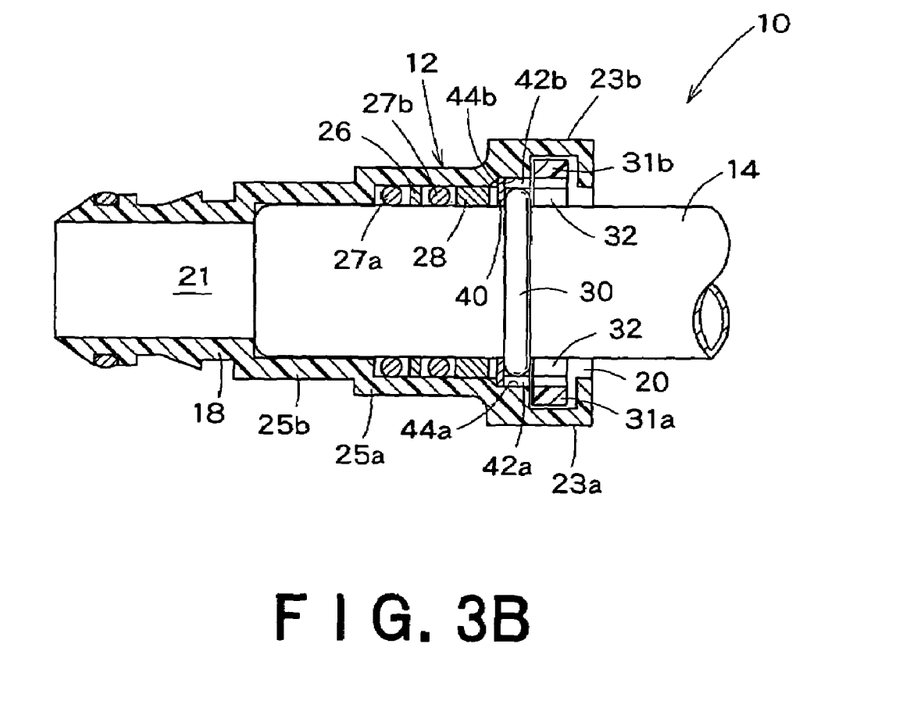
FIG. 3B is a longitudinal sectional view of the quick connector shown in FIG. 1 in a state where the restraining ring is at a releasing position.

FIG. 1 is an exploded perspective view of a quick connector 10 in a first embodiment according to the present. Shown in FIG. 1 are a housing 12, a tube 14 and a retainer 16. FIG. 2 is a cross-sectional view of the housing 12 in a state where the retainer 16 is temporarily combined with the housing 12. FIG. 3A is a longitudinal sectional view of the housing 12 in a state where the tube 14 is inserted in the housing. FIG. 3B is a longitudinal sectional view of the housing 12 in a state where the retainer 16 is able to retain the tube 14 in the housing 12.

The housing 12 of the quick connector 10 is a female joint having an opening 20 through which the tube 14 is inserted in the housing 12. The housing 12 is integrally provided with a tube connector 18. The tube connector 18 is pressed in a resin tube 17. As shown in FIG. 3, the housing 12 has an axial stepped bore 21.

A circumferential upper slot 22 is formed in an upper part of the housing 12. The retainer 16 is inserted in a direction perpendicular to the axis of the housing 12 through the upper slot 22 in the housing 12. A circumferential lower slot 24 is formed in a lower part of the housing 12. The upper slot 22 and the lower slot 24 are separated by opposite side walls 23a and 23b.

The housing 12 has a first cylindrical part 25a, a second cylindrical part 25b extending from the first cylindrical part 25a and having an outside diameter smaller than that of the first cylindrical part 25a, and the tube connector 18 extending from the second cylindrical part 25b. As shown in FIG. 3, O rings 27a and 27b are fitted in the first cylindrical part 25a of the housing 12 and a spacer 26 is interposed between the O rings 27a and 27b. A stop ring 28 prevents the O rings 27a and 27b from coming off the first cylindrical part 25a.

Referring to FIG. 1, the tube 14 is formed of a metal and is provided with an annular ridge 30 at a predetermined distance from its tip. The retainer 16 engages with the annular ridge 30 to restrain the tube 14 from falling off the housing 12 when the retainer 16 is inserted through the upper slot 22 in the housing 12.

The retainer 16 is a U-shaped member formed of a plastic or a metal. The retainer 16 has opposite, parallel legs 31a and 31b. The retainer 16 is thin as compared with conventional retainers of this kind. The thickness of the retainer 16 corresponds to the axial width of the slot 22.

As shown in FIGS. 1 and 2, the retainer 16 is integrally provided with a U-shaped rib 32 extending between the legs 31a and 31b. The U-shaped rib 32 has a curved inner surface of a curvature substantially equal to that of the outer surface of the tube 14. Therefore, the rib 32 comes into close contact with the tube 14 inserted in the housing 12. The legs 31a and 31b are provided in their tips with locking hooks 34a and 34b, respectively. The locking hooks 34a and 34b are able to engage with the lower edges of the side walls 23a and 23b of the housing 12, respectively.

The retainer 16 is integrally provided with a restraining ring 40. The restraining ring 40 inhibits the false insertion of the retainer 16 in the housing 12.

The restraining ring 40 has an inside diameter slightly greater than the outside diameter of the tube 14 and smaller than the diameter of the annular ridge 30. Thus the tube 14 is able to loosely pass through the restraining ring 40 and the annular ridge 30 is unable to pass through the restraining ring 40.

Figure 4:
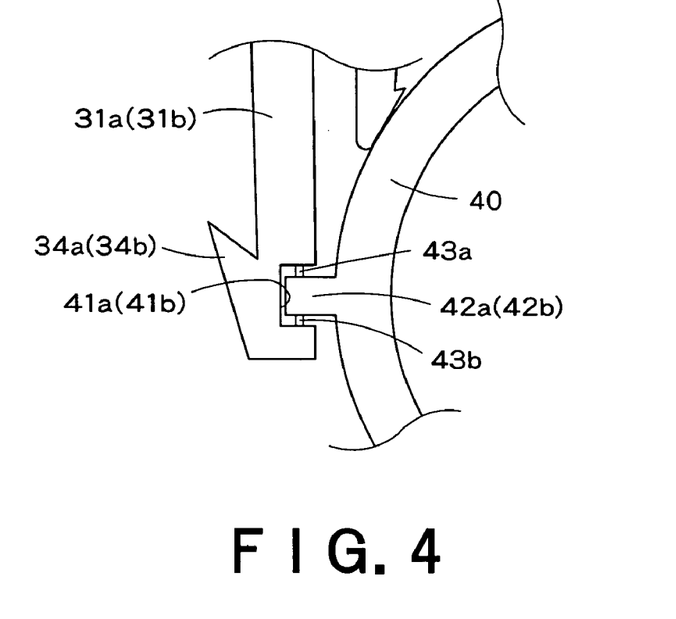
FIG. 4 is a fragmentary end view of a locking part of the restraining ring connected to a retainer.

Referring to FIG. 4, grooves 41a and 41b are formed in the inner side surfaces of parts, corresponding to the locking hooks 34a and 34b, of the opposite legs 31a and 31b of the retainer 16, respectively. The grooves 41a and 41a extend perpendicularly to the legs 31a and 31b. The restraining ring 40 is integrally provided with short, thin locking bars 42a and 42b formed respectively at diametrically opposite positions. The locking bars 42a and 42b engage in the grooves 41a and 41b, respectively.

As shown in FIG. 4, the locking bar 42a (42b) is connected to the side walls of the groove 41a (41b) by very thin shear fins 43a and 43b. The shear fins 43a and 43b break when a force exceeding a predetermined force is exerted thereon. The shear fins 43a and 43b extend between the upper surface of the locking bar 42a (42b) and one of the opposite side surface of the groove 41a (41b), and between the lower surface of the locking bar 42a (42b) and the other side surface of the groove 41a (41b), respectively.

As shown in FIG. 3, axial relief grooves 44a and 44b are formed in the inner circumference of the housing 12 so as to correspond to the grooves 41a and 41b of the retainer 16 integrally provided with the restraining ring 40. The retainer 16 shown in FIG. 3 is at a temporary position as shown in FIG. 2, and the grooves 41a and 41b are aligned with the relief grooves 44a and 44b, respectively.

Functions of the quick connector 10 will be explained.

First, the temporary combination of the retainer 16 and the housing 12 will be described.

Referring to FIG. 1, the retainer 16 integrally provided with the restraining ring 40 is inserted lightly through the upper slot 22 of the housing 12 in the housing 12 to set the retainer 16 at a temporary position in the housing 12. When the retainer 16 is thus set at the temporary position, the locking hooks 34a and 34b of the legs 31a and 31b of the retainer 16 are engaged in grooves 46a and 46b formed in the inner surfaces of the side walls 23a and 23b of the housing 12, respectively, as shown in FIG. 2, and the restraining ring 40 is coaxial with the housing 12.

The quick connector 10 is shipped to the user in a state where the retainer 16 is temporarily combined with the housing 12. When the user uses the quick connector 10, for example, in an automobile assembling plant, in a fuel system assembling process for connecting fuel lines for supplying fuel to an engine, the retainer 16 is simply pressed into the housing 12 after inserting the tube 14 in the housing 12.

Figure 5A:
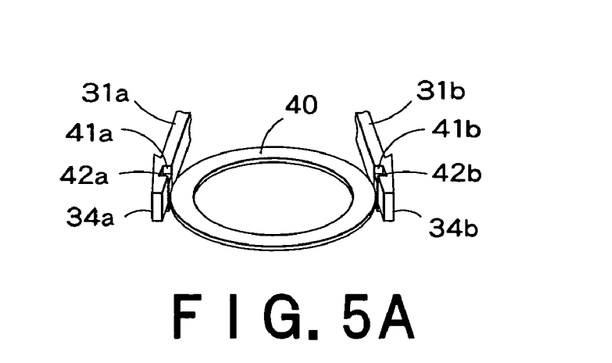
FIG. 5A is a perspective view of the restraining ring in a state where the locking parts are connected to the retainer.
Figure 5B:
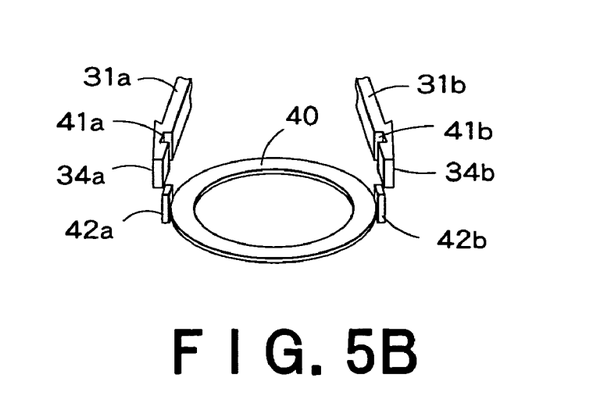
FIG. 5B is a perspective view of the restraining ring in a state where the locking parts of the restraining ring are disconnected from the retainer.

As shown in FIGS. 3A and 5A, the annular ridge 30 of the tube 14 collides with the restraining ring 40 when an end part of the tube 14 is inserted in the housing 12 by hand and the collision of the annular ridge 30 with the restraining ring 40 makes the hand feel a resistance against the insertion of the tube 14 in the housing 12. When the tube 14 is pushed further into the housing 12 against the resistance, the shear fins 43a and 43b connecting the restraining ring 40 to the retainer 16 are torn off and the restraining ring 40 is separated from the retainer 16. Consequently, the locking bars 42a and 42b are disengaged from the grooves 41a and 41b and enter the relief grooves 44a and 44b aligned with the grooves 41a and 41b, respectively, as shown in FIGS. 3B and 5B, and the restraining ring 40 is allowed to move to the releasing position.

Then, the retainer 16 is pressed into the housing from the temporary position to a working position, so that the locking hooks 34a and 34b formed in the lower end of the legs 31a and 31b engage with the lower edges of the side walls 23a and 23b of the housing 12, respectively. In this state, the inner end edge of the rib 32 of the retainer 16 is in engagement with the outer side of the annular ridge 30 to retain the end part of the tube 14 in the housing 12. Thus the tube 14 and the housing 12 of the quick connector 10 are locked firmly together by the retainer 16. When the tube 14 and the housing 12 of the quick connector 10 are thus locked together, gaps between the housing 12 and the tube 14 are sealed effectively by the O rings 24a and 24b.

If the end part of the tube 14 is inserted insufficiently deep in the housing 12, the shear fins 43a and 42b are not torn off, the locking bars 42a and 42b remain engaged in the grooves 41a and 41b or the locking bars 42a and 42b remain partly engaged in the grooves 41a and 41b even if the shear fins 43a and 43b are torn off. Consequently, the restraining ring 40 stays at the restraining position and the retainer 16 cannot be moved from the temporary position to the working position because the locking bars 42a and 42b of the restraining ring 40 are engaged in the grooves 41a and 41b.

When the tube 14 is incompletely connected to the quick connector 10, the end part of the tube 14 extends through the O rings 27a and 27b and the sealing effect of the O rings 27a and 27b is effective. However, the incomplete connection of the tube 14 and the quick connector 10 can be known quite obviously from the visual observation of the retainer 16 staying at the temporary position as well as from a feel. Therefore, the tube 14 and the quick connector 10 are never left incompletely connected.

The retainer 16 is far thinner than the conventional retainers and the retainer 16 cannot be properly pressed into the housing when the end part of the tube 14 is inserted insufficiently deep in the housing 12. Therefore, the housing 12 does not need to be formed in a long length like the housing of the conventional quick connector shown in FIG. 8. The quick connector 10 in this embodiment is compact, can assume only either an incompletely locked state or a completely locked state and can be surely prevented from being left in a falsely locked state. The retainer 16 is far thinner than the conventional retainers may be formed, for example, in a thickness smaller than the outside diameter of the tube 14 or smaller than half the outside diameter of the tube 14.

Whereas the thin retainer mentioned in Patent document 3 is provided with the ring to be torn off, the retainer 16 of the present invention is provided with the restraining ring 40 provided with the locking bars 42a and 42b, and the locking bars 42a and 42b are shifted accurately by a distance for which the locking bars 42a and 42b are moved by the annular ridge 30. Thus, a distance by which the annular ridge 30 must be pressed into the housing 12 to enable the retainer 16 to be pressed into the housing can be accurately determined by properly determining the size of the locking bars 42a and 42b.

Second Embodiment

Figure 6:
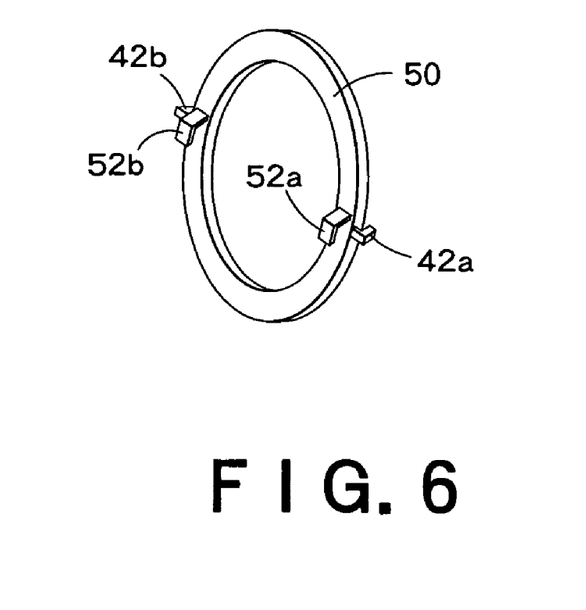
FIG. 6 is a perspective view of a restraining ring included in a quick connector in a second embodiment according to the present invention.

FIG. 6 shows a restraining ring 50 included in a quick connector in a second embodiment according to the present invention. The locking bars 42a and 42b of the restraining ring 40 of the quick connector 10 in the first embodiment are connected to the retainer 16 by the shear fins 43a and 43b. In the quick connector in the second embodiment, a retainer 16 and the restraining ring 50 are individual members. The retainer 16 of the second embodiment is the same as the retainer 16 of the first embodiment and hence the description thereof will be omitted.

Figure 7:
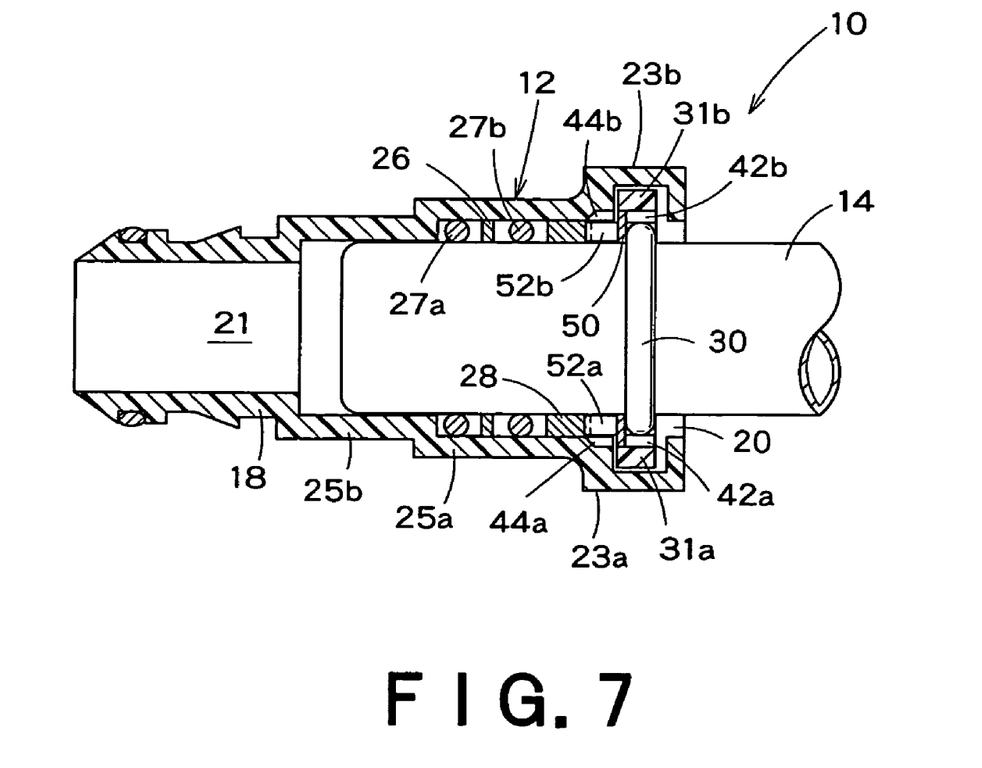
FIG. 7 is a longitudinal sectional view of the quick connector in the second embodiment in a state where the restraining ring is at a restraining position.

The restraining ring 50 has a small thickness and is provided, similarly to the restraining ring 40 of the first embodiment, with short locking bars 42a and 42b respectively at diametrically opposite positions. The restraining ring 50 is provided integrally with elastic pushing lugs 52a and 52b analogous with plate springs and projecting from parts, near the locking bars 42a and 42b, of the inner end surface of the restraining ring 50. As shown in FIG. 7, the elastic pushing lugs 52a and 52b are in contact with the outer end surface of a stop ring 28 disposed at the boundary between the bore of a first cylindrical part 25a and a part, provided with relief grooves 44a and 44b, of the inner circumference of a housing 12 to push the restraining ring 50 toward a restraining position.

Referring to FIG. 7, when an end part of a tube 14 is inserted in the housing 12, an annular ridge 30 formed on the tube 14 collides with the restraining ring 50. When the tube 14 is inserted further in the housing 12 to a predetermined connecting position, the locking bars 42a and 42b of the restraining ring 50 are disengaged from grooves 41a and 41b formed in the retainer 16 and engage in the relief grooves 44a and 44b of the housing 12 to permit the restraining ring 50 to move to a releasing position.

Since the restraining ring 50 is unable to move to the releasing position unless the tube 14 is inserted sufficiently deep in the housing 12, the quick connector is never left in a falsely locked state with the tube 14 incompletely connected to the quick connector. The retainer 16 cannot be pressed into the housing 12 and remains projected from the housing 12 until the restraining ring 50 is moved to the releasing position. Therefore, the incomplete connection of the tube 14 and the quick connector can be known quite obviously from the visual observation of the retainer 16 staying at a temporary position as well as from a feel and hence the quick connector is never left in a falsely locked state.

Whereas the quick connector in the first embodiment has the retainer 16 integrally provided with the retainer 40 which is torn off the retainer 16, the quick connector in the second embodiment has the retainer 16 and the restraining ring 50 separate from the retainer 16. Therefore, the restraining ring 50 can be repeatedly used. For example, in some cases, the tube 14 is disconnected from the housing 12 and then the tube 14 is connected again to the housing 12 in an automobile dealer's shop. The restraining ring 50 of the second embodiment provided with the elastic pushing lugs 52a and 52b pushing the restraining ring 50 toward the restraining position is able to indicate a falsely connected state when the tube 14 is connected again to the quick connector.

As apparent from the foregoing description, according to the present invention, the retainer cannot be pressed into the housing to lock the tube at the predetermined position for complete connection only when the end part of the tube is inserted in the housing and placed at the position for complete connection to prevent connecting the tube to the quick connector in a falsely locked state. Thus the present invention achieves both preventing the connection of the tube to the quick connector in a falsely locked state and forming the quick connector in compact construction.

The invention claimed is:

1. A quick connector having a housing in which an end part of a tube provided with an annular ridge is insertable, and a U-shaped retainer capable of being pressed into the housing in a direction perpendicular to the axis of the housing through an opening formed in the housing and of engaging with the annular ridge to connect the tube to the housing, said retainer comprising legs, said quick connector comprising a restraining ring having an inside diameter not greater than the outside diameter of the annular ridge and greater than the outside diameter of the tube, capable of axially moving in the housing between a restraining position for restraining the retainer from movement and a releasing position for releasing the retainer, said retaining ring being provided with locking parts, capable of engaging with the legs of the retainer extending along the opposite sides of the retainer, to restrain the retainer from movement;

wherein the restraining ring is movable to the releasing position to release the retainer so that the retainer can be moved when the end part of the tube is inserted in the housing and is placed correctly at a predetermined connecting position, wherein holding grooves are formed in the inner surfaces of end parts of the legs, respectively, and axial relief grooves are formed in the inner circumference of the housing respectively in alignment with the holding grooves when the retainer is temporarily combined with the housing, wherein the locking parts are disengaged from the holding grooves and are engaged in the relief grooves, respectively, when the restraining ring is moved from the restraining position to the releasing position, wherein the restraining ring is formed integrally with the retainer with shear parts connecting the restraining ring and the retainer so as to permit the shear parts to shear off when the restraining ring is pressed deep into the housing by the annular ridge of the tube, wherein the shear parts extend between the locking parts and the holding grooves.

2. The quick connector according to claim 1 characterized in that the shear parts extend between the upper surface of each locking part and a side wall of the holding groove and between the lower surface of the same locking part and a side wall of the same holding groove, respectively.

3. The quick connector according to claim 1 characterized in that the locking parts are formed at diametrically opposite positions, respectively, on the restraining ring.

4. The quick connector according to claim 1 characterized in that the retainer is very thin.

5. The quick connector according to claim 4 characterized in that the thickness of the retainer is smaller than the outside diameter of the tube.

6. The quick connector according to claim 5 characterized in that the thickness of the retainer is smaller than half the outside diameter of the tube.

7. A quick connector having a housing in which an end part of a tube provided with an annular ridge in insertable, and a U-shaped retainer capable of being pressed into the housing in a direction perpendicular to the axis of the housing through an opening formed in the housing and of engaging with the annular ridge to connect the tube to the housing, said retainer comprising legs, said quick connector comprising a restraining ring having an inside diameter not greater than the outside diameter of the annular ridge and greater than the outside diameter of the tube, capable of axially moving in the housing between a restraining position for restraining the retainer from movement and a releasing position for releasing the retainer, said retaining ring being provided with locking parts, capable of engaging with the legs of the retainer extending along the opposite sides of the retainer, to restrain the retainer from movement;

wherein the restraining ring is movable to the releasing position to release the retainer so that the retainer can be moved when the end part of the tube is inserted in the housing and is placed correctly at a predetermined connecting position, wherein holding grooves are formed in the inner surfaces of end parts of the legs, respectively, and axial relief grooves are formed in the inner circumference of the housing respectively in alignment with the holding grooves when the retainer is temporarily combined with the housing, wherein the locking parts are disengaged from the holding grooves and are engaged in the relief grooves, respectively, when the restraining ring is moved from the restraining position to the releasing position, wherein the restraining ring is not integrally formed with the retainer, and the restraining ring is provided with elastic parts that push the restraining ring toward the restraining position.

8. The quick connector according to claim 7 characterized in that the elastic parts have a shape resembling a plate spring.

* * * * *